US011688851B2

(12) United States Patent
Herle

(10) Patent No.: US 11,688,851 B2
(45) Date of Patent: Jun. 27, 2023

(54) METHOD OF FORMING AN ANODE STRUCTURE WITH DIELECTRIC COATING

(71) Applicant: Applied Materials, Inc., Santa Clara, CA (US)

(72) Inventor: Subramanya P. Herle, Mountain View, CA (US)

(73) Assignee: Applied Materials, Inc., Santa Clara, CA (US)

( * ) Notice: Subject to any disclaimer, the term of this patent is extended or adjusted under 35 U.S.C. 154(b) by 576 days.

(21) Appl. No.: 16/584,660

(22) Filed: Sep. 26, 2019

(65) Prior Publication Data
US 2020/0020911 A1    Jan. 16, 2020

Related U.S. Application Data

(60) Division of application No. 15/836,214, filed on Dec. 8, 2017, now Pat. No. 10,461,298, which is a
(Continued)

(51) Int. Cl.
*H01M 4/38*   (2006.01)
*H01M 10/0525*   (2010.01)
(Continued)

(52) U.S. Cl.
CPC ............. *H01M 4/382* (2013.01); *H01M 4/38* (2013.01); *H01M 4/405* (2013.01); *H01M 4/661* (2013.01);
(Continued)

(58) Field of Classification Search
None
See application file for complete search history.

(56) References Cited

U.S. PATENT DOCUMENTS

| 5,208,121 A | 5/1993 | Yahnke et al. |
| 5,342,709 A | 8/1994 | Yahnke et al. |

(Continued)

FOREIGN PATENT DOCUMENTS

| CN | 1415123 A | 4/2003 |
| CN | 1494173 A | 5/2004 |

(Continued)

OTHER PUBLICATIONS

"Vacuum Deposition and Coating Options" by Dr. Lampert, published online (2013).*

(Continued)

*Primary Examiner* — Basia A Ridley
*Assistant Examiner* — Heng M. Chan
(74) *Attorney, Agent, or Firm* — Patterson + Sheridan, LLP

(57) ABSTRACT

ABSTRACT OF THE DISCLOSURE The present disclosure generally relates to battery anode structures with dielectric coating and methods of forming the same. In one implementation, a method of forming an anode structure is provided and includes exposing a material to be deposited on an anode positioned in a processing region to an evaporation process; flowing a reactive gas into the processing region; and reacting the reactive gas and the evaporated material to deposit a porous dielectric layer on at least a portion of the anode and form the anode structure. In another implementation, an anode electrode structure is provided and includes an anode containing at least one of lithium metal, lithium-alloy, or a mixture of lithium metal and lithium alloy; and at least one dielectric layer capable of conducting ions, wherein the at least one dielectric layer at least partially covers an anode surface and has a thickness of 1 to 2,000 nanometers.

13 Claims, 8 Drawing Sheets

Related U.S. Application Data continuation of application No. 15/349,477, filed on Nov. 11, 2016, now Pat. No. 10,411,238, which is a continuation of application No. 14/937,442, filed on Nov. 10, 2015, now Pat. No. 9,508,976.

(60) Provisional application No. 62/171,313, filed on Jun. 5, 2015, provisional application No. 62/101,794, filed on Jan. 9, 2015.

(51) Int. Cl.
| | |
|---|---|
| H01M 4/40 | (2006.01) |
| H01M 4/02 | (2006.01) |
| H01M 4/66 | (2006.01) |
| H01M 10/052 | (2010.01) |
| H01M 50/42 | (2021.01) |
| H01M 50/417 | (2021.01) |
| H01M 50/426 | (2021.01) |
| H01M 50/497 | (2021.01) |
| H01M 50/491 | (2021.01) |
| H01M 50/437 | (2021.01) |
| H01M 50/434 | (2021.01) |
| H01M 50/451 | (2021.01) |
| H01M 50/489 | (2021.01) |

(52) U.S. Cl.
CPC ..... *H01M 10/052* (2013.01); *H01M 10/0525* (2013.01); *H01M 50/417* (2021.01); *H01M 50/42* (2021.01); *H01M 50/426* (2021.01); *H01M 50/434* (2021.01); *H01M 50/437* (2021.01); *H01M 50/451* (2021.01); *H01M 50/489* (2021.01); *H01M 50/491* (2021.01); *H01M 50/497* (2021.01); *H01M 2004/027* (2013.01)

(56) References Cited

U.S. PATENT DOCUMENTS

| | | | |
|---|---|---|---|
| 5,656,391 A | 8/1997 | Hambitzer et al. | |
| 5,705,292 A | 1/1998 | Yukita et al. | |
| 5,948,464 A | 9/1999 | Delnick | |
| 5,961,672 A | 10/1999 | Skotheim et al. | |
| 6,153,337 A | 11/2000 | Carlson et al. | |
| 6,183,901 B1 | 2/2001 | Ying et al. | |
| 6,194,098 B1 | 2/2001 | Ying et al. | |
| 6,277,514 B1 | 8/2001 | Ying et al. | |
| 6,306,545 B1 | 10/2001 | Carlson et al. | |
| 6,432,586 B1 | 8/2002 | Zhang | |
| 7,662,510 B2 | 2/2010 | Zhang | |
| 7,666,233 B2 | 2/2010 | Visco et al. | |
| 7,754,015 B2 | 7/2010 | Sasaki et al. | |
| 7,928,411 B2 | 4/2011 | Klemm et al. | |
| 8,017,262 B2 | 9/2011 | Fujikawa et al. | |
| 8,142,920 B2 | 3/2012 | Hennige et al. | |
| 8,182,948 B2 | 5/2012 | He et al. | |
| 8,202,649 B2 | 6/2012 | Visco et al. | |
| 8,372,475 B2 | 2/2013 | Kim et al. | |
| 8,394,535 B2 | 3/2013 | Kobori et al. | |
| 8,394,536 B2 | 3/2013 | Kobori et al. | |
| 8,425,738 B2 | 4/2013 | Hoffman et al. | |
| 8,470,468 B2 | 6/2013 | Xiao et al. | |
| 8,518,582 B2 | 8/2013 | Park et al. | |
| 8,535,826 B2 | 9/2013 | Jeong et al. | |
| 8,591,223 B2 | 11/2013 | Hein et al. | |
| 8,597,819 B2 | 12/2013 | Hennige et al. | |
| 8,663,730 B1 | 3/2014 | Lahiri et al. | |
| 8,691,419 B2 | 4/2014 | Lee et al. | |
| 9,065,122 B2 | 6/2015 | Orilall et al. | |
| 9,142,833 B2 | 9/2015 | Tolbert et al. | |
| 9,508,976 B2 | 11/2016 | Herle | |
| 9,548,486 B2 | 1/2017 | Abe et al. | |
| 9,660,310 B2 | 5/2017 | Mak et al. | |
| 2004/0106037 A1 | 6/2004 | Cho et al. | |
| 2004/0131944 A1 | 7/2004 | Visco et al. | |
| 2005/0186469 A1 | 8/2005 | De Jonghe et al. | |
| 2006/0177732 A1 | 8/2006 | Visco et al. | |
| 2006/0222933 A1 | 10/2006 | Fujikawa et al. | |
| 2007/0281206 A1 | 12/2007 | Fujikawa et al. | |
| 2009/0110807 A1 | 4/2009 | Koenig | |
| 2010/0216026 A1 | 8/2010 | Lopatin et al. | |
| 2010/0233548 A1 | 9/2010 | Pijnenburg et al. | |
| 2010/0330410 A1 | 12/2010 | Takahashi et al. | |
| 2012/0251890 A1 | 10/2012 | Pascaly et al. | |
| 2012/0301615 A1* | 11/2012 | Honda ............... C23C 14/564 118/724 |
| 2012/0301774 A1 | 11/2012 | Jiang et al. | |
| 2013/0199030 A1 | 8/2013 | Song et al. | |
| 2013/0260184 A1 | 10/2013 | Yu et al. | |
| 2013/0260208 A1 | 10/2013 | Cho et al. | |
| 2013/0337312 A1 | 12/2013 | Park et al. | |
| 2014/0045033 A1 | 2/2014 | Zhang et al. | |
| 2014/0072884 A1 | 3/2014 | Zhang et al. | |
| 2014/0133068 A1 | 5/2014 | Iwai et al. | |
| 2014/0212727 A1 | 7/2014 | Hying et al. | |
| 2014/0227443 A1 | 8/2014 | Hoffmann et al. | |
| 2014/0227455 A1 | 8/2014 | Hoffmann et al. | |
| 2014/0268490 A1 | 9/2014 | Tsai et al. | |
| 2014/0272524 A1 | 9/2014 | Visco et al. | |
| 2014/0322587 A1 | 10/2014 | Lai et al. | |
| 2014/0335395 A1 | 11/2014 | Ramasubramanian et al. | |
| 2015/0064576 A1 | 3/2015 | Aitken et al. | |
| 2015/0132633 A1 | 5/2015 | Joshi | |
| 2015/0140404 A1 | 5/2015 | Yoo et al. | |
| 2015/0236320 A1 | 8/2015 | Laramie et al. | |
| 2015/0236322 A1 | 8/2015 | Laramie et al. | |
| 2015/0325828 A1 | 11/2015 | Herle et al. | |
| 2017/0025658 A1 | 1/2017 | Shi et al. | |
| 2017/0062788 A1 | 3/2017 | Herle | |

FOREIGN PATENT DOCUMENTS

| | | | |
|---|---|---|---|
| CN | 1860566 A | 11/2006 | |
| CN | 101416293 B | 4/2011 | |
| CN | 102405545 A | 4/2012 | |
| CN | 102629676 A | 8/2012 | |
| EP | 0761726 A2 | 3/1997 | |
| EP | 1146576 A1 | 10/2001 | |
| JP | 06036800 A | * | 2/1994 |
| JP | 2002231221 A | 8/2002 | |
| JP | 2005-183179 A | 7/2005 | |
| JP | 2005183179 A | * | 7/2005 |
| JP | 2006/503416 A | 1/2006 | |
| JP | 2006/313739 A | 11/2006 | |
| JP | 2008/111160 A | 5/2008 | |
| JP | 2012181921 A | 9/2012 | |
| JP | 2015073015 A | 4/2015 | |
| KR | 20150026553 A | 3/2015 | |
| WO | 2009/081594 A1 | 7/2009 | |
| WO | 2010/093368 A1 | 8/2010 | |
| WO | 2011/093073 A1 | 8/2011 | |
| WO | 2012050406 A2 | 4/2012 | |
| WO | 2014093519 A1 | 6/2014 | |
| WO | 2017/172880 A1 | 10/2017 | |

OTHER PUBLICATIONS

Office Action for Japanese Application No. 2017-563067 dated Jan. 17, 2020.
Search Report for Taiwanese Application No. 107105174 dated Jan. 18, 2020.
Office Action for Taiwanese Application No. 107105174 dated Feb. 3, 2020.
Extended European Search Report for European Application No. 16804102.8 dated Nov. 20, 2018.
Communication pursuant to Rules 70(2) and 70a(2) EPC for European Application No. 16804102.8 dated Dec. 7, 2018.
Struller, et al., "Aluminum Oxide Barrier Layers on Polymer Web," 2012, 12 pages.
Kim, et al., "Surface-Modified Membrane as a Separator for Lithium-Ion Polymer Battery," Energies, 2010, 3 pages 866-885.

(56) References Cited

OTHER PUBLICATIONS

Zhang, "A Review on the Separators of Liquid Electrolyle Li-Ion Batteries," Journal of Power Sources, 164 (2007) pp. 351-364.

Lee, et al., "A Review of Recent Developments in Membrane Separators for Rechargeable Lithium-Ion Batteries," Royal Society of Chemistry, Energy and Environmental Science, Aug. 18, 2014, 30 pages.

Zhang, et al., "Superior Conductive Solid-like Electrolytes: Nanoconfining Liquids Within the Hollow Structures,""5 Nano Letters, 2015, 15 (5) Apr. 6, 2015, 5 pages".

Choi, et al., "Enhancement of Thermal Stability and Cycling Performance in Lithium-Ion Cells through the Use of Ceramic-Coated Separators," Journal of Power Sources 195 (2010), 5 pages.

Lee, et al., "Effect of Al2O3 Coatings Prepared by RF Sputtering on Polyethylene Separators for High-Power Lithium on Batteries," Macromolecular Research, 2014, vol. 22, No. 11, pp. 1190-1195.

International Search Report and Written Opinion for International Application No. PCT/US2016/034579 dated Aug. 24, 2016.

Office Action for U.S. Appl. No. 14/937,442 dated Mar. 10, 2016.

Suo, et al., "A New Class of Solvent-in-Salt Electrolyte for High-Energy Rechargeable Metallic Lithium Batteries," Nature Communications, Feb. 12, 2013, 9 pages.

Yoo, et al., "Initialed Chemical Vapor Deposition {iCVD) of Highly Cross-Linked Polymer Films for Advanced 11, Lithiumon Battery Separators," ACS Applied Materials & Interfaces 2015, 7, pp. 18849-18855.

Novak, et al., "Study of Surface Properties of Polyolefins Modified by Corona Discharge Plasma," Plasma Processes and Polymers, 2006, 3, pp. 355-364.

Shin, et al., "Composite Gel Electrolytes for Suppressing Lithium Dendrite Growth and Improving Cycling Performance of LiNi0.5Mn1.5O4 Electrodes," Journal of The Electrochemical Society, 162 (14 ), 2015, pp. A2628-A2634.

Evonik Industries, "Growth Drivers in Our Portfolio: Lithium-ion Battery Components," Jun. 2009, 4 pages.

Office Action for U.S. Appl. No. 15/836,214 dated Apr. 3, 2019.

Search Report for Taiwan Application No. 105117501 dated Dec. 17, 2019.

Office Action for Taiwan Application No. 105117501 dated Dec. 20, 2019.

Office Action for Chinese Application No. 201680032907.3 dated Mar. 26, 2020.

Search Report for Chinese Application No. 201680032907.3 dated Mar. 19, 2020.

Office Action for Chinese Applicatio No. 201680032907.3 dated Jul. 9, 2020.

Chinese Office Action dated Oct. 9, 2022 for Application No. 202011373938.X.

Korean Office Action dated Mar. 7, 2023 for Application No. 10-2018-7000407.

* cited by examiner

METHOD OF FORMING AN ANODE STRUCTURE WITH DIELECTRIC COATING

CROSS-REFERENCE TO RELATED APPLICATIONS

This application is a divisional of U.S. patent application Ser. No. 15/836,214, filed Dec. 8, 2017, which is a continuation of U.S. patent application Ser. No. 15/349,477, filed Nov. 11, 2016, now U.S. Pat. No. 10,411,238, which is a continuation of U.S. patent application Ser. No. 14/937,442, filed Nov. 10, 2015, now U.S. Pat. No. 9,508,976, which claims benefit of U.S. provisional patent application Ser. No. 62/101,794, filed Jan. 9, 2015, and benefit of U.S. provisional patent application Ser. No. 62/171,313, filed Jun. 5, 2015. All of the aforementioned related patent applications are incorporated by reference herein in their entirety.

BACKGROUND

Field

Implementations of the present disclosure generally relate to separators, high performance electrochemical devices, such as, batteries and capacitors, including the aforementioned separators, and methods for fabricating the same.

Description of the Related Art

Fast-charging, high-capacity energy storage devices, such as capacitors and lithium-ion (Li-ion) batteries, are used in a growing number of applications, including portable electronics, medical, transportation, grid-connected large energy storage, renewable energy storage, and uninterruptible power supply (UPS).

Li-ion batteries typically include an anode electrode, a cathode electrode, and a separator positioned between the anode electrode and the cathode electrode. The separator is an electronic insulator, which provides physical and electrical separation between the cathode and the anode electrodes. The separator is typically made from micro-porous polyethylene and polyolefin. During electrochemical reactions, i.e., charging and discharging, Li-ions are transported through the pores in the separator between the two electrodes via an electrolyte. Thus, high porosity is desirable to increase ionic conductivity. However, some high porosity separators are susceptible to electrical shorts when lithium dendrites formed during cycling create shorts between the electrodes.

Currently, battery cell manufacturers purchase separators, which are then laminated together with anode and cathode electrodes in separate processing steps. Other separators are typically made by wet or dry extrusion of a polymer and then stretched to produce holes (tears) in the polymer. The separator is also one of the most expensive components in the Li-ion battery and accounts for over 20% of the material cost in battery cells.

For most energy storage applications, the charge time and capacity of energy storage devices are important parameters. In addition, the size, weight, and/or expense of such energy storage devices can be significant limitations. The use of currently available separators has a number of drawbacks. Namely, such available materials limit the minimum size of the electrodes constructed from such materials, suffer from electrical shorts, require complex manufacturing methods, and expensive materials. Further, current separator designs often suffer from Lithium dendrite growth, which may lead to short-circuits.

Accordingly, there is a need in the art for faster charging, higher capacity energy storage devices with separators that are smaller, lighter, and can be more cost effectively manufactured.

SUMMARY

Implementations of the present disclosure generally relate to separators, high performance electrochemical devices, such as, batteries and capacitors, including the aforementioned separators, and methods for fabricating the same. In one implementation, a separator for a battery is provided. The separator comprises a substrate capable of conducting ions and at least one dielectric layer capable of conducting ions. The at least one dielectric layer at least partially covers the substrate and has a thickness of 1 nanometer to 2,000 nanometers.

In another implementation, a battery is provided. The battery comprises an anode containing at least one of lithium metal or lithium-alloy or a mixture of lithium metal and/or lithium alloy and another material, tin, or silicon, a cathode, and a separator disposed between the anode and the cathode. The separator comprises a porous substrate capable of conducting ions and at least one dielectric layer capable of conducting ions. The at least one dielectric layer at least partially covers the substrate and has a thickness of 1 nanometer to 2,000 nanometers.

In yet another implementation, a separator for a battery is provided. The separator comprises at least one porous dielectric layer having a thickness of 1 nanometer to 2,000 nanometers and a microporous ion-conducting polymeric substrate adhered to the at least one porous dielectric layer. In one implementation, the porous dielectric layer is a porous aluminum oxide layer. In one implementation, the porous dielectric layer is a binder-free dielectric layer. In one implementation, the porous dielectric layer has a thickness in the range of 10 nanometers to 600 nanometers. In one implementation, the porous dielectric layer has a thickness in the range of 50 nanometers to 200 nanometers. In one implementation, the microporous ion-conducting polymeric substrate has a thickness in the range of 5 microns to 50 microns. In one implementation, the microporous ion-conducting polymeric substrate has a thickness in the range of 6 microns to 25 microns. In one implementation, the microporous ion-conducting polymeric substrate is a polyolefinic membrane. In one implementation, the polyolefinic membrane is a polyethylene membrane. In one implementation, the aluminum oxide layer further consists of zirconium oxide, silicon oxide, or combinations thereof.

In yet another implementation, a battery is provided. The battery comprises an anode containing at least one of lithium metal or lithium-alloy or a mixture of lithium metal and/or lithium alloy and another material, tin, or silicon, a cathode, and a separator. The separator comprises at least one porous dielectric layer having a thickness of 1 nanometer to 2,000 nanometers and a microporous ion-conducting polymeric substrate adhered to the at least one porous dielectric layer. In one implementation, the battery further comprises an electrolyte in ionic communication with the anode and the cathode via the separator. In one implementation, the battery further comprises a positive current collector contacting the cathode and a negative current collector contacting the anode, wherein the positive current collector and the negative current collector are each independently comprises of materials selected from aluminum (Al), copper (Cu), zinc (Zn), nickel (Ni), cobalt (Co), tin (Sn), silicon (Si), manganese (Mn), magnesium (Mg), alloys thereof, and combinations thereof.

In yet another implementation, a method of forming a separator for a rechargeable lithium-ion battery is provided. The method comprises exposing a material to be deposited on a porous ion-conducting polymer substrate positioned in a processing region to an evaporation process, flowing a reactive gas into the processing region and reacting the reactive gas and the evaporated material to deposit a dielectric layer on at least a portion of the porous ion-conducting polymer substrate. In one implementation, the material is selected from the group consisting of: aluminum (Al), zirconium (Zr), hafnium (Hf), niobium (Nb), tantalum (Ta), titanium (Ti), yttrium (Y), lanthanum (La), silicon (Si), boron (B), silver (Ag), chromium (Cr), copper (Cu), indium (In), iron (Fe), magnesium (Mg), calcium (Ca), strontium (Sr), barium (Ba), nickel (Ni), tin (Sn), ytterbium (Yb), lithium (Li) calcium or combinations thereof. In one implementation, the reactive gas is an oxygen-containing gas selected from the group consisting of: oxygen ($O_2$), ozone ($O_3$), oxygen radicals (O*), ionized oxygen atoms, carbon dioxide ($CO_2$), nitric oxide ($NO_x$), water vapor, or combinations thereof. In one implementation, the dielectric layer is aluminum oxide. In one implementation, the evaporation process is a thermal evaporation process or an electron beam evaporation process. In one implementation, the microporous ion-conducting polymeric substrate is exposed to a surface modification treatment process to enhance the nucleation/growth conditions of the microporous ion-conducting polymeric substrate. In one implementation, the surface modification treatment process comprises supplying a treatment gas mixture into the processing region and forming a plasma from the treatment gas mixture to plasma treat at least a portion of the microporous ion-conducting polymeric substrate, wherein the treatment gas mixture comprises an oxygen-containing gas, an inert gas, or combinations thereof. In one implementation, the method further comprises exposing the microporous ion-conducting polymeric substrate to a cooling process prior to exposing the material to an evaporation process. In one implementation, the cooling process cools the microporous ion-conducting polymeric substrate to a temperature between −20 degrees Celsius and 22 degrees Celsius. In one implementation, the cooling process cools the microporous ion-conducting polymeric substrate to a temperature between −10 degrees Celsius and 0 degrees Celsius. In one implementation, the evaporation process comprises exposing the material to a temperature of between 1,300 degrees Celsius and 1,600 degrees Celsius. In one implementation, the dielectric layer is a porous aluminum oxide layer. In one implementation, the dielectric layer is a binder-free dielectric layer. In one implementation, the dielectric layer has a thickness in the range of 1 nanometer and 2,000 nanometers. In one implementation, the dielectric layer has a thickness in the range of 10 nanometers to 500 nanometers. In one implementation, the microporous ion-conducting polymeric substrate has a thickness in the range of 5 microns to 50 microns. In one implementation, the microporous ion-conducting polymeric substrate has a thickness in the range of 6 microns to 25 microns. In one implementation, the microporous ion-conducting polymeric substrate is a polyolefinic membrane.

BRIEF DESCRIPTION OF THE DRAWINGS

So that the manner in which the above-recited features of the present disclosure can be understood in detail, a more particular description of the implementations, briefly summarized above, may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

Figure 1:
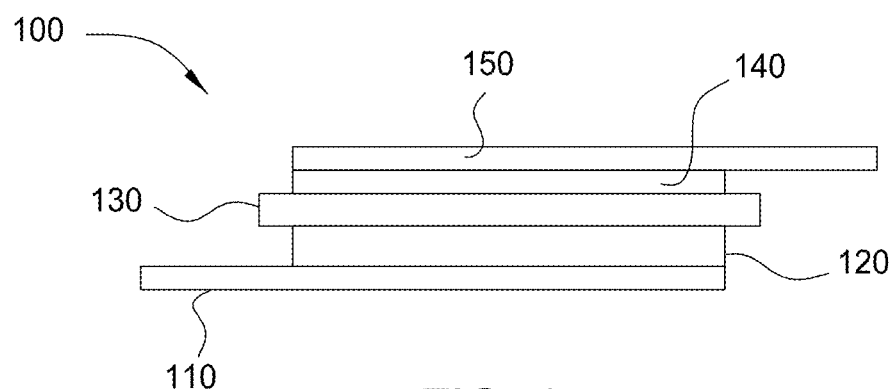
FIG. 1 illustrates a cross-sectional view of one implementation of an electrode structure formed according to implementations described herein.

To facilitate understanding, identical reference numerals have been used, where possible, to designate identical elements that are common to the figures. It is contemplated that elements and features of one implementation may be beneficially incorporated in other implementations without further recitation. It is to be noted, however, that the appended drawings illustrate only exemplary implementations of this disclosure and are therefore not to be considered limiting of its scope, for the disclosure may admit to other equally effective implementations.

DETAILED DESCRIPTION

The following disclosure describes separators, high performance electrochemical cells and batteries including the aforementioned separators, and methods for fabricating the same. Certain details are set forth in the following description and in FIGS. 1-9 to provide a thorough understanding of various implementations of the disclosure. Other details describing well-known structures and systems often associated with electrochemical cells and batteries are not set forth in the following disclosure to avoid unnecessarily obscuring the description of the various implementations.

Many of the details, dimensions, angles and other features shown in the Figures are merely illustrative of particular implementations. Accordingly, other implementations can have other details, components, dimensions, angles and features without departing from the spirit or scope of the present disclosure. In addition, further implementations of the disclosure can be practiced without several of the details described below.

Implementations described herein will be described below in reference to a high rate evaporation process that can be carried out using a roll-to-roll coating system, such as TopMet™, SmartWeb™, TopBeam™, all of which are available from Applied Materials, Inc. of Santa Clara, Calif. Other tools capable of performing high rate evaporation processes may also be adapted to benefit from the implementations described herein. In addition, any system enabling high rate evaporation processes described herein can be used to advantage. The apparatus description described herein is illustrative and should not be construed or interpreted as limiting the scope of the implementations described herein. It should also be understood that although described as a roll-to-roll process, the implementations described herein may also be performed on discrete polymer substrates.

The term "about" generally indicates within ±0.5%, 1%, 2%, 5%, or up to ±10% of the indicated value. For example, a pore size of about 10 nm generally indicates in its broadest sense 10 nm±10%, which indicates 9.0-11.0 nm. In addition, the term "about" can indicate either a measurement error (i.e., by limitations in the measurement method), or alternatively, a variation or average in a physical characteristic of a group (e.g., a population of pores).

The term "crucible" as used herein shall be understood as a unit capable of evaporating material that is fed to the crucible when the crucible is heated. In other words, a crucible is defined as a unit adapted for transforming solid material into vapor. Within the present disclosure, the term "crucible" and "evaporation unit" are used synonymously.

The texture of the material and the porosity data on the materials described herein can be analyzed by dinitrogen adsorption and desorption measurements. The specific surface area can be calculated by Brunauer-Emmett-Teller (BET) equation. The pore diameter distribution and the mean pore diameter can be calculated using Barrett-Joyner-Halenda (BJH) method from the adsorption branch of the $N_2$ adsorption-desorption isotherm.

The currently available generation batteries, especially Li-ion batteries, use porous polyolefin separators, which are susceptible to thermal shrinkage at elevated temperatures and may cause short between positive and negative electrodes or the corresponding current collectors. A ceramic coating on the separator helps to inhibit direct contact between electrodes and also helps to prevent potential dendrite growth associated with Li metal. Current state of the art ceramic coating is done using wet coating (e.g., slot-die techniques) of ceramic particles dispersed in a polymeric binder to make the composite and a solvent to make the slurry. The coating thickness is typically around 3 microns including randomly oriented dielectric material bound together by a polymer leading to a random pore structure. The existing ceramic particle coating method has difficulty in reducing tortuosity due to this random orientation of ceramic particles. Further, it is difficult to reduce the thickness of current ceramic coatings using current wet coating methods. In order to compensate for the increased surface area of finer ceramic powder particles current wet coating methods require increased amounts of both binder and solvent to decrease the viscosity of the slurry. Thus, the current wet coating methods suffer from several problems.

From a manufacturing point of view, an in-situ deposition of a ceramic coating with a dry method is preferred from both a cost and performance point of view. In the present disclosure, a thin, low ionic resistance ceramic coating is formed on a polymeric microporous substrate, where the ceramic coating is formed by a dry method using reactive evaporation of metals or metal compounds. Further, the ceramic coating can be tuned for desired thickness, micro/nanostructure, multilayered structure, morphology, pore structure and pore/ceramic orientation.

Compared to conventional ceramic coated separators, the reactive evaporation techniques described herein have at least one of the following advantages: (1) thinner separators result in less inactive component volume fraction and a corresponding increase in energy density and less ionic resistance across the separator; (2) the control of coating thickness and morphology provides less tortuous pores leading to superior separator performance; (3) the pore surface of the ceramic enhances the ionic conductivity of the overall electrolyte; and (4) suitably engineered ceramic coated separator shall enhance X-ray detection to determine manufacturing defects; and (5) higher voltage stability and puncture resistance properties of the separator can be achieved by nanocomposite coating control. Lithium dendrite inhibiting properties of ceramic-coated separator are enhanced by nanosurface engineering to achieve homogeneous lithium metal deposition and stripping during cycling.

FIG. 1 illustrates an example Li-ion battery structure having a coated separator according to implementations of the present disclosure. Cell 100 has a positive current collector 110, a positive electrode 120, a coated separator 130, a negative electrode 140 and a negative current collector 150. Note in FIG. 1 that the current collectors are shown to extend beyond the stack, although it is not necessary for the current collectors to extend beyond the stack, the portions extending beyond the stack may be used as tabs.

The current collectors 110, 150, on positive electrode 120 and negative electrode 140, respectively, can be identical or different electronic conductors. Examples of metals that the current collectors 110, 150 may be comprised of include aluminum (Al), copper (Cu), zinc (Zn), nickel (Ni), cobalt (Co), tin (Sn), silicon (Si), manganese (Mn), magnesium (Mg), alloys thereof, and combinations thereof. In one implementation, at least one of the current collectors 110, 150 is perforated. Furthermore, current collectors may be of any form factor (e.g., metallic foil, sheet, or plate), shape and micro/macro structure. Generally, in prismatic cells, tabs are formed of the same material as the current collector and may be formed during fabrication of the stack, or added later. All components except current collectors 110 and 150 contain lithium ion electrolytes.

The negative electrode 140 or anode may be any material compatible with the positive electrode 120. The negative electrode 140 may have an energy capacity greater than or equal to 372 mAh/g, preferably 700 mAh/g, and most preferably 1000 mAh/g. The negative electrode 140 may be constructed from a lithium metal foil or a lithium alloy foil (e.g. lithium aluminum alloys), or a mixture of a lithium metal and/or lithium alloy and materials such as carbon (e.g. coke, graphite), nickel, copper, tin, indium, silicon, oxides thereof, or combinations thereof. The negative electrode 140 comprises intercalation compounds containing lithium or insertion compounds containing lithium.

The positive electrode 120 or cathode may be any material compatible with the anode and may include an intercalation compound, an insertion compound, or an electrochemically active polymer. Suitable intercalation materials include, for example, lithium-containing metal oxides, $MoS_2$, $FeS_2$, $MnO_2$, $TiS_2$, $NbSe_3$, $LiCoO_2$, $LiNiO_2$, $LiMnO_2$, $LiMn_2O_4$, $V_6O_{13}$ and $V_2O_5$. Suitable polymers include, for example, polyacetylene, polypyrrole, polyaniline, and polythiopene. The positive electrode 120 or cathode may be made from a layered oxide, such as lithium cobalt oxide, an olivine, such as lithium iron phosphate, or a spinel, such as lithium manganese oxide. Exemplary lithium-containing oxides may be layered, such as lithium cobalt oxide ($LiCoO_2$), or mixed metal oxides, such as $LiNi_xCo_{1-2x}MnO_2$, $LiNiMnCoO_2$, ("NMC"), $LiNi_{0.5}Mn_{1.5}O_4$, $Li(Ni_{0.8}Co_{0.15}Al_{0.05})O_2$, $LiMn_2O_4$, and doped lithium rich layered-layered materials, wherein x is zero or a non-zero number. Exemplary phosphates may be iron olivine ($LiFePO_4$) and it is variants (such as $LiFe_{(1-x)}Mg_xPO_4$), $LiMoPO_4$, $LiCoPO_4$, $LiNiPO_4$, $Li_3V_2(PO_4)_3$, $LiVOPO_4$, $LiMP_2O_7$, or $LiFe_{1.5}P_2O_7$, wherein x is zero or a non-zero number. Exemplary fluorophosphates may be $LiVPO_4F$, $LiAlPO_4F$, $Li_5V(PO_4)_2F_2$, $Li_5Cr(PO_4)_2F_2$, $Li_2CoPO_4F$, or $Li_2NiPO_4F$. Exemplary silicates may be $Li_2FeSiO_4$, $Li_2MnSiO_4$, or $Li_2VOSiO_4$. An exemplary non-lithium compound is $Na_5V_2(PO_4)_2F_3$.

In some implementations of a lithium ion cell according to the present disclosure, lithium is contained in atomic layers of crystal structures of carbon graphite ($LiC_6$) at the negative electrode and lithium manganese oxide ($LiMnO_4$) or lithium cobalt oxide ($LiCoO_2$) at the positive electrode, for example, although in some implementations the negative electrode may also include lithium absorbing materials such as silicon, tin, etc. The cell, even though shown as a planar structure, may also be formed into a cylinder by rolling the stack of layers; furthermore, other cell configurations (e.g., prismatic cells, button cells) may be formed.

Electrolytes infused in cell components 120, 130 and 140 can be comprised of a liquid/gel or a solid polymer and may be different in each. In some implementations, the electrolyte primarily includes a salt and a medium (e.g., in a liquid electrolyte, the medium may be referred to as a solvent; in a gel electrolyte, the medium may be a polymer matrix). The salt may be a lithium salt. The lithium salt may include, for example, $LiPF_6$, $LiAsF_6$, $LiCF_3SO_3$, $LiN(CF_3SO_3)_3$, $LiBF_6$, and $LiClO_4$, BETTE electrolyte (commercially available from 3M Corp. of Minneapolis, Minn.) and combinations thereof. Solvents may include, for example, ethylene carbonate (EC), propylene carbonate (PC), EC/PC, 2-MeTHF (2-methyltetrahydrofuran)/EC/PC, EC/DMC (dimethyl carbonate), EC/DME (dimethyl ethane), EC/DEC (diethyl carbonate), EC/EMC (ethyl methyl carbonate), EC/EMC/DMC/DEC, EC/EMC/DMC/DEC/PE, PC/DME, and DME/PC. Polymer matrices may include, for example, PVDF (polyvinylidene fluoride), PVDF:THF (PVDF:tetrahydrofuran), PVDF:CTFE (PVDF: chlorotrifluoroethylene) PAN (polyacrylonitrile), and PEO (polyethylene oxide).

Figure 2:
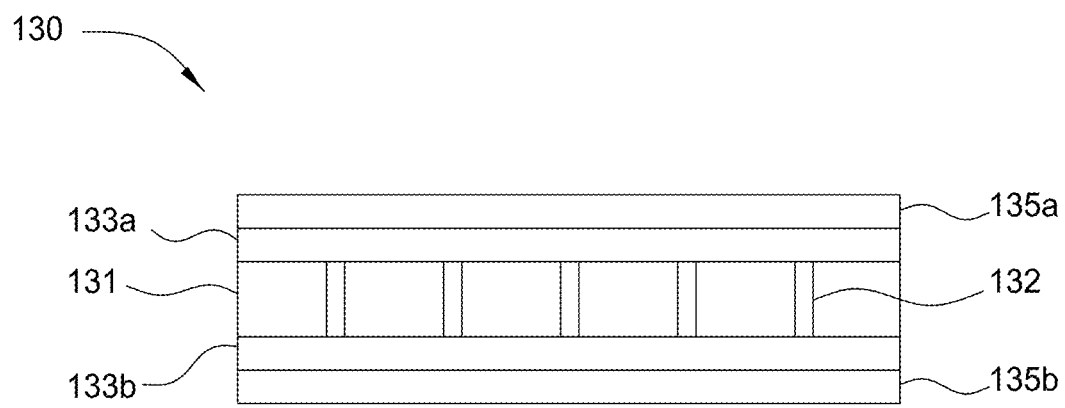
FIG. 2 illustrates a cross-sectional view of a coated separator for a lithium-ion battery according to implementations described herein.

FIG. 2 illustrates a cross-sectional view of a coated separator 130 for a lithium-ion battery according to implementations described herein. The coated separator 130 comprises a porous (e.g., microporous) polymeric substrate capable of conducting ions (e.g., a separator film) 131 with pores 132 and a first dielectric layer 133a and an optional second dielectric layer 133b (collectively dielectric layer 133) positioned on opposite surfaces of the porous polymeric substrate 131. In some implementations, the porous polymeric substrate itself does not need to be ion conducting, however, once filled with electrolyte (liquid, gel, solid, combination etc.), the combination of porous substrate and electrolyte is ion conducting. Although a first dielectric layer 133a and a second dielectric layer 133b are shown, it should be understood that in some implementations, only the first dielectric layer 133a is present. The dielectric layer 133 is, at least, adapted for preventing electronic shorting (e.g. direct or physical contact of the anode and the cathode) and blocking dendrite growth. The porous polymeric substrate 131 may be, at least, adapted for blocking (or shutting down) ionic conductivity (or flow) between the anode and the cathode during the event of thermal runaway. The dielectric layer 133 of the coated separator 130 should be sufficiently conductive to allow ionic flow between the anode and cathode, so that current, in desired quantities, may be generated by the cell. The porous polymeric substrate 131 and the dielectric layer 133 should adhere well to one another, i.e. separation should not occur. As discussed herein, the dielectric layer 133 is formed on the porous polymeric substrate 131 using evaporation techniques.

In one implementation, the porous polymeric substrate is a microporous ion-conducting polymeric substrate. In one implementation, the porous polymeric substrate is a multi-layer polymeric substrate. In one implementation, the pores 132 are micropores. In some implementations, the porous polymeric substrate 131 consists of any commercially available polymeric microporous membranes (e.g., single or multi-ply), for example, those products produced by produced by Polypore (Celgard Inc., of Charlotte, N.C.), Toray Tonen (Battery separator film (BSF)), SK Energy (lithium ion battery separator (LiBS), Evonik industries (SEPARION® ceramic separator membrane), Asahi Kasei (Hipore™ polyolefin flat film membrane), DuPont (Energain®), etc. In some implementations, the porous polymeric substrate 131 has a porosity in the range of 20 to 80% (e.g., in the range of 28 to 60%). In some implementations, the porous polymeric substrate 131 has an average pore size in the range of 0.02 to 5 microns (e.g., 0.08 to 2 microns). In some implementations, the porous polymeric substrate 131 has a Gurley Number in the range of 15 to 150 seconds (Gurley Number refers to the time it takes for 10 cc of air at 12.2 inches of water to pass through one square inch of membrane). In some implementations, the porous polymeric substrate 131 is polyolefinic. Exemplary polyolefins include polypropylene, polyethylene, or combinations thereof.

The dielectric layer 133 comprises one or more dielectric materials. The dielectric material may be a ceramic material. The ceramic material may be an oxide. The dielectric material may be selected from, for example, aluminum oxide ($Al_2O_3$), $AlO_x$, $AlO_xN_y$, AlN (aluminum deposited in a nitrogen environment), calcium carbonate ($CaCO_3$), titanium dioxide ($TiO_2$), $SiS_2$, $SiPO_4$, silicon oxide ($SiO_2$), zirconium oxide ($ZrO_2$), MgO, $TiO_2$, $Ta_2O_5$, $Nb_2O_5$, $LiAlO_2$, $BaTiO_3$, BN, ion-conducting garnet, ion-conducting perovskite, ion-conducting anti-perovskites, porous glass ceramic, and the like, or combinations thereof. In one implementation, the dielectric material is a material selected from the group consisting of: porous aluminum oxide, porous-$ZrO_2$, porous-$SiO_2$, porous-MgO, porous-$TiO_2$, porous-$Ta_2O_5$, porous-$Nb_2O_5$, porous-$LiAlO_2$, porous-$BaTiO_3$, ion-conducting garnet, anti-ion-conducting perovskites, porous glass dielectric, or combinations thereof. The dielectric layer 133 is a binder-free dielectric layer. In some implementations, the dielectric layer 133 is a porous aluminum oxide layer.

In some implementations, the dielectric layer comprises from about 50 wt. % to about 100 wt. % of aluminum oxide based on the total weight of the dielectric layer (e.g., from about 75 wt. % to about 100 wt. %; from about 85 wt. % to about 100 wt. % of aluminum oxide).

In some implementations, the dielectric material is blended with glass evaporated in an oxidizing atmosphere.

For example, $SiO_2$ can be introduced into $Al_2O_3$ to modify the physical properties (such as flexibility, fracture toughness) of the dielectric layer.

In some implementations, the dielectric layer 133 comprises a plurality of dielectric columnar projections. The dielectric columnar shaped projections may have a cauliflower-shape. The dielectric columnar shaped projections may have a diameter that expands from the bottom (e.g., where the columnar shaped projection contacts the porous substrate) of the columnar shaped projection to a top of the columnar shaped projection. The dielectric columnar projections typically comprise dielectric grains. Nano-structured contours or channels are typically formed between the dielectric grains.

In some implementations, the plurality of dielectric columnar projections may comprise one or more of various forms of porosities. In some implementations, the columnar projections of the dielectric layer 133 form a nano-porous structure between the columnar projections of dielectric material. In one implementation, the nano-porous structure may have a plurality of nano-pores that are sized to have an average pore size or diameter less than about 10 nanometers (e.g., from about 1 nanometer to about 10 nanometers; from about 3 nanometers to about 5 nanometers). In another implementation, the nano-porous structure may have a plurality of nano-pores that are sized to have an average pore size or diameter less than about 5 nanometers. In one implementation, the nano-porous structure has a plurality of nano-pores having a diameter ranging from about 1 nanometer to about 20 nanometers (e.g., from about 2 nanometers to about 15 nanometers; or from about 5 nanometers to about 10 nanometers). The nano-porous structure yields a significant increase in the surface area of the dielectric layer 133. The pores of the nano-porous structure can act as liquid electrolyte reservoir and also provides excess surface area for ion-conductivity. Not to be bound by theory but it is believed that the electrolyte liquid/gel confined within the nano-porous structure behaves similar to solid electrolyte.

In some implementations, the dielectric layer 133 has a porosity of at least 10%, 15%, 20%, 25%, 30%, 35%, 40%, 45%, 50%, 55%, 60%, or 65% as compared to a solid film formed from the same material and a porosity up to at least 15%, 20%, 25%, 30%, 35%, 40%, 45%, 50%, 55%, 60%, 65%, or 70% as compared to a solid film formed from the same material.

Porosity is typically used since it is easy to estimate. However, tortuosity is the direct measure for describing a lithium diffusion pathway. Tortuosity describes the tortuous path for Li diffusion in porous media. For example, if diffusion is along a straight pathway, the tortuosity equals 1. Tortuosity is not easily measured due to the complex geometry in dielectric layers (i.e., irregular particle shapes, wide particle size distribution, etc.). It is believed that direct engineering tortuosity, i.e., introducing "straight" pathway or channels, is desirable. Dielectric layers formed using the evaporation processes disclosed herein exhibit lower tortuosity when compared with dielectric layers formed using currently know slot die techniques or other slurry deposition techniques.

The dielectric layer 133 may be a coating or a discrete layer, either having a thickness in the range of 1 nanometer to 2,000 nanometers (e.g., in the range of 10 nanometers to 600 nanometers; in the range of 50 nanometers to 200 nanometers; in the range of 100 nanometers to 150 nanometers). The porous polymeric substrate 131 is preferably a discrete membrane having a thickness in the range of 5 microns to 50 microns (e.g., in the range of 6 microns to 25 microns). The overall thickness of the coated separator 130 is in the range of 5 microns to 60 microns (e.g., in the range of 6 microns to 50 microns; in the range of 12 microns to 25 microns).

The coated separator can have any suitable total specific surface area. For example, in different implementations, the total specific surface area can be at least $5\ m^2/g$, $10\ m^2/g$, $20\ m^2/g$, $30\ m^2/g$, $40\ m^2/g$, $50\ m^2/g$, $60\ m^2/g$, $70\ m^2/g$, $80\ m^2/g$, $90\ m^2/g$, $100\ m^2/g$, $200\ m^2/g$, $300\ m^2/g$, $400\ m^2/g$, $500\ m^2/g$, $600\ m^2/g$, $700\ m^2/g$, $800\ m^2/g$, $900\ m^2/g$, or $1000\ m^2/g$, or within a range bounded by any two of these.

The coated separator can have any suitable cumulative pore area. For example, in different implementations, the cumulative pore area can be at least $5\ m^2/g$, $10\ m^2/g$, $20\ m^2/g$, $30\ m^2/g$, $40\ m^2/g$, $41\ m^2/g$, $42\ m^2/g$, $43\ m^2/g$, $44\ m^2/g$, $45\ m^2/g$, $46\ m^2/g$, $47\ m^2/g$, $48\ m^2/g$, $49\ m^2/g$, $50\ m^2/g$, $51\ m^2/g$, $52\ m^2/g$, $53\ m^2/g$, $54\ m^2/g$, $55\ m^2/g$, $56\ m^2/g$, $57\ m^2/g$, $58\ m^2/g$, $59\ m^2/g$, $60\ m^2/g$, $61\ m^2/g$, $62\ m^2/g$, $63\ m^2/g$, $64\ m^2/g$, $65\ m^2/g$, $66\ m^2/g$, $67\ m^2/g$, $68\ m^2/g$, $69\ m^2/g$, $70\ m^2/g$, $80\ m^2/g$, $90\ m^2/g$, $100\ m^2/g$, $200\ m^2/g$, $300\ m^2/g$, $400\ m^2/g$, $500\ m^2/g$, $600\ m^2/g$, $700\ m^2/g$, $800\ m^2/g$, $900\ m^2/g$, or $1000\ m^2/g$, or within a range bounded by any two of these values.

The coated separator can have any suitable total pore volume. For example, in different implementations, the total pore volume can be at least $0.5\ cm^3/g$, $0.54\ cm^3/g$, $0.55\ cm^3/g$, $0.56\ cm^3/g$, $0.6\ cm^3/g$, $0.61\ cm^3/g$, $0.62\ cm^3/g$, $0.63\ cm^3/g$, $0.64\ cm^3/g$, $0.65\ cm^3/g$, $0.66\ cm^3/g$, $0.67\ cm^3/g$, $0.68\ cm^3/g$, $0.69\ cm^3/g$, $0.7\ cm^3/g$, $0.75\ cm^3/g$, $0.8\ cm^3/g$, $0.86\ cm^3/g$, $0.87\ cm^3/g$, $0.9\ cm^3/g$, $1\ cm^3/g$, $1.1\ cm^3/g$, $1.2\ cm^3/g$, $1.3\ cm^3/g$, $1.4\ cm^3/g$, $1.5\ cm^3/g$, $1.6\ cm^3/g$, $1.7\ cm^3/g$, $1.8\ cm^3/g$, $1.9\ cm^3/g$, $2\ cm^3/g$, $2.1\ cm^3/g$, or $2.2\ cm^3/g$, or within a range bounded by any two of these values.

In one implementation, a first dielectric polymer layer 135a and an optional second dielectric layer 135b (collectively 135) are formed on opposite surfaces of the dielectric layer 133 to further enhance the electrochemical performance of the end device (e.g., battery). The polymer can be chosen from polymers currently used in the Li-ion battery industry. Examples of polymers that may be used to form the dielectric polymer layer include, but are not limited to, polyvinylidene difluoride (PVDF), polyethylene oxide (PEO), poly-acrylonitrile (PAN), carboxymethyl cellulose (CMC), styrene butadiene rubber (SBR), and combinations thereof. Not to be bound by theory but it is believed that the dielectric polymer layer can up-take Li-conducting electrolyte to form gel during device fabrication which is beneficial for forming good solid electrolyte interface (SEI) and also helps lower resistance. The dielectric polymer layer 135 can be formed by dip-coating, slot-die coating, gravure coating, or printing. The polymer can also be deposited using Applied Materials Metacoat equipment. The dielectric polymer layer may have a thickness from about 5 nanometers to about 1 micrometers.

For separators made of polypropylene-polyethylene-polypropylene (PP-PE-PP) tri-layer, there is an option to enhance the bonding between PP-PE interface and also enhance thermal and mechanical stability of the separator by depositing dielectric layers on top of PP or PE and integrate tri-layer separator with dielectric layers between PP-PE.

Figure 3:
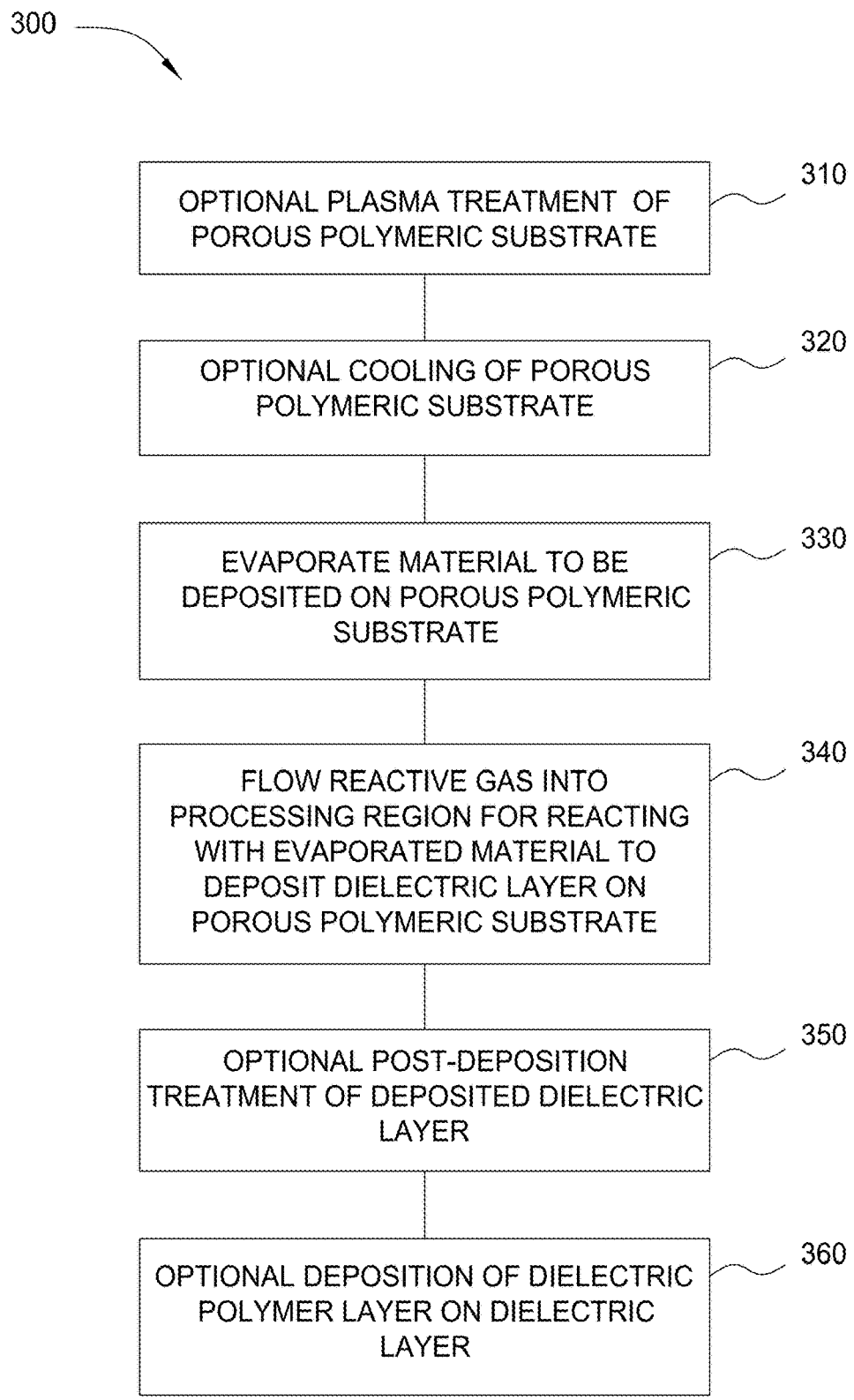
FIG. 3 illustrates a process flow chart summarizing one implementation of a method for forming an electrode structure according to implementations described herein.

FIG. 3 illustrates a process flow chart summarizing one implementation of a method 300 for forming an electrode structure such as cell 100 depicted in FIG. 1, according to implementations described herein.

At block 310, the microporous ion-conducting polymeric substrate is optionally exposed to a surface modification treatment to enhance the nucleation/growth conditions of the porous polymeric substrate 131. In some implementations, the surface modification treatment process is a plasma treatment process (e.g., corona discharge treatment process). The surface modification treatment process performed at block 310 includes supplying a treatment gas mixture into a processing region. A plasma is then formed from the treatment gas mixture to plasma treat the upper surface of the porous polymeric substrate 131 to activate at least a portion of the porous polymeric substrate 131 into an excited state, forming a treated porous polymeric substrate 131 having a treated upper surface which may then enhance the nucleation/growth conditions of the subsequently deposited dielectric layer 133.

In one implementation, the treatment gas mixture includes at least one of oxygen-containing gas, an inert gas (e.g., argon, helium), or combinations thereof. In one implementation, the oxygen-containing gas supplied into the processing region includes at least one of oxygen ($O_2$), ozone ($O_3$), oxygen radicals ($O^*$), ionized oxygen atoms, carbon dioxide ($CO_2$), nitric oxide ($NO_x$), water vapor, or combinations thereof. Other oxygen-containing gases may be used.

According to one implementation of the present disclosure involving oxidation, a gas source supplies oxygen gas ($O_2$) through a mass flow controller to an ozonator, which converts a large fraction of the oxygen to ozone gas ($O_3$). The resultant oxygen-based mixture of $O_2$ and $O_3$ and perhaps some oxygen radicals $O^*$ and ionized oxygen atoms or molecules is delivered into the processing region. The oxygen-based gas reacts within the processing region with the surface of the porous polymeric substrate 131, which has been heated to a predetermined, preferably low temperature. Ozone is a metastable molecule which spontaneously quickly dissociates in the reaction $O_3 \rightarrow O_2 + O^*$, where $O^*$ is a radical, which very quickly reacts with whatever available material can be oxidized. The ozonator may be implemented in a number of forms including capacitively or inductively coupled plasma or a UV lamp source.

At these high ozone concentrations, the porous polymeric substrate 131 need not be heated very much to achieve relatively high oxidation rates. The high ozone concentration also allows the ozone partial pressure to be reduced. The high ozone fraction allows the ozone oxidation to be performed at pressures of less than 20 Torr. It should be understood that the aforementioned surface modification technique is exemplary and other surface modifications techniques that achieve the desired surface modification may also be used. For example, in some implementations, this preparation may include exposing the separator to a corona treatment, chemically treating it (e.g. with an oxidizing agent), or adsorbing or grafting a polyelectrolyte to the surface of the separator. Having a charged separator may be desired for a first layer of oppositely charged material to bind to the separator.

In some implementations, the surface modification treatment process is an electron beam treatment process. An electron beam source is directed onto a surface of the microporous ion-conducting polymeric substrate prior to coating the microporous ion-conducting polymeric substrate. The electron beam source may be a linear source. The electron beam device emitting the electron beam is typically adapted such that the electron beam affects the microporous ion-conducting polymeric substrate across its entire width, such that due to the longitudinal movement of the microporous ion-conducting polymeric substrate, the whole surface (on one side) of the microporous ion-conducting polymeric substrate is treated with the electron beam. The electron beam device may for example be an electron source such as an electron flood gun, a linear electron gun, an electron beam, or the like. The gas used in the electron source may be Argon, $O_2$, $N_2$, $CO_2$, or He, more particularly $O_2$, $N_2$, $CO_2$, or He.

The microporous ion-conducting polymeric substrate treated with the emitted electrons is physically, respectively structurally altered in order to achieve improved adhesion between the microporous ion-conducting polymeric substrate and the subsequently deposited dielectric layer. The desired effect can be achieved by providing electrons at energies from 1 keV to 15 keV, more typically from 5 keV to 10 keV, for example, 6 keV, 7 keV, 8 keV or 9 keV. Typical electron currents are from 20 mA to 1500 mA, for example 500 mA.

At block 320, the porous polymeric substrate 131 is optionally exposed to a cooling process. In one implementation, the porous polymeric substrate 131 may be cooled to a temperature between −20 degrees Celsius and room temperature (i.e., 20 to 22 degrees Celsius) (e.g., −10 degrees Celsius and 0 degrees Celsius). In some implementations, the porous polymeric substrate 131 may be cooled by cooling the drum that the microporous ion-conducting polymeric substrate travels over. Other active cooling means may be used to cool the microporous ion-conducting polymeric substrate. During the evaporation process, the porous polymeric substrate 131 may be exposed to temperatures in excess of 1,000 degrees Celsius thus it is beneficial to cool the porous polymeric substrate 131 prior to the evaporation process of block 330.

At block 330, the material to be deposited on the porous polymeric substrate 131 is exposed to an evaporation process to evaporate the material to be deposited in a processing region. The evaporation material may be chosen from the group consisting of aluminum (Al), zirconium (Zr), hafnium (Hf), niobium (Nb), tantalum (Ta), titanium (Ti), yttrium (Y), lanthanum (La), silicon (Si), boron (B), silver (Ag), chromium (Cr), copper (Cu), indium (In), iron (Fe), magnesium (Mg), calcium (Ca), strontium (Sr), barium (Ba), nickel (Ni), tin (Sn), ytterbium (Yb), lithium (Li), calcium (Ca) or combinations thereof. Typically, the material to be deposited is a metal such as aluminum. Further, the evaporation material may also be an alloy of two or more metals. The evaporation material is the material that is evaporated during the evaporation and with which the microporous ion-conducting polymeric substrate is coated. The material to be deposited (e.g., aluminum) can be provided in a crucible. The aluminum can, for example, be evaporated by thermal evaporation techniques or by electron beam evaporation techniques.

In some implementations, the evaporation material is fed to the crucible as a wire. In this case, the feeding rates and/or the wire diameters have to be chosen such that the desired ratio of the evaporation material and the reactive gas is achieved. In some implementations, the diameter of the feeding wire for feeding to the crucible is chosen between 0.5 mm and 2.0 mm (e.g., between 1.0 mm and 1.5 mm). These dimensions may refer to several feedings wires made of the evaporation material. Typical feeding rates of the wire are in the range of between 50 cm/min and 150 cm/min (e.g., between 70 cm/min and 100 cm/min).

The crucible is heated in order to generate a vapor, which reacts with the reactive gas supplied at block 340 to coat the porous polymeric substrate 131 with the dielectric layer 133. Typically, the crucible is heated by applying a voltage to the electrodes of the crucible, which are positioned at opposite sides of the crucible. Generally, according to implementations described herein, the material of the crucible is conductive. Typically, the material used as crucible material is temperature resistant to the temperatures used for melting and evaporating. Typically, the crucible of the present disclosure is made of one or more materials selected from the group consisting of metallic boride, metallic nitride, metallic carbide, non-metallic boride, non-metallic nitride, non-metallic carbide, nitrides, titanium nitride, borides, graphite, $TiB_2$, BN, $B_4C$, and SiC.

The material to be deposited is melted and evaporated by heating the evaporation crucible. Heating can be conducted by providing a power source (not shown) connected to the first electrical connection and the second electrical connection of the crucible. For instance, these electrical connections may be electrodes made of copper or an alloy thereof. Thereby, heating is conducted by the current flowing through the body of the crucible. According to other implementations, heating may also be conducted by an irradiation heater of an evaporation apparatus or an inductive heating unit of an evaporation apparatus.

The evaporation unit according to the present disclosure is typically heatable to a temperature of between 1,300 degrees Celsius and 1,600 degrees Celsius, such as 1,560 degrees Celsius. This is done by adjusting the current through the crucible accordingly, or by adjusting the irradiation accordingly. Typically, the crucible material is chosen such that its stability is not negatively affected by temperatures of that range. Typically, the speed of the porous polymeric substrate 131 is in the range of between 20 cm/min and 200 cm/min, more typically between 80 cm/min and 120 cm/min such as 100 cm/min. In these cases, the means for transporting should be capable of transporting the substrate at those speeds.

At block 340, a reactive gas is flowed into the processing region for reacting with the evaporated material to form a dielectric layer on at least a portion of the porous polymeric substrate. According to typical implementations, which can be combined with other implementations described herein, the reactive gases can be selected from the group consisting of: oxygen-containing gases, nitrogen-containing gases, or combinations thereof. Exemplary oxygen-containing gases that may be used with the implementations described herein include oxygen ($O_2$), ozone ($O_3$), oxygen radicals (O*), or combinations thereof. Exemplary nitrogen containing gases that may be used with the implementations described herein include $N_2$, $N_2O$, $NO_2$, $NH_3$, or combinations thereof. According to yet further implementations, additional gases, typically inert gases such as argon can be added to a gas mixture comprising the reactive gas. Thereby, typically the amount of reactive gas can be more easily controlled. According to typical implementations, which can be combined with other implementations described herein, the process can be carried out in a vacuum environment with a typical atmosphere of $1*10^{-2}$ mbar to $1*10^{-6}$ mbar (e.g., $1*10^{-3}$ mbar or below; $1*10^{-4}$ mbar or below).

At block 350, an optional post-deposition treatment of the deposited dielectric layer is performed. The optional post-deposition treatment may include a post-deposition plasma treatment to densify the deposited dielectric layer, additional "functionalization" processes may be performed post-deposition; for example, complete oxidation of $AlO_x$ to form $Al_2O_3$, or deposition of polymer material to enhance puncture resistance of the membrane etc.

Deposition continues until the desired thickness of the dielectric layer is deposited and the coated separator is removed from the web tool 400. It should be noted that the deposition can be repeated for forming films on both sides of the separator structure.

Optionally, at block 360, a dielectric polymer layer is deposited on the dielectric layer. The dielectric polymer layer can be formed by dip-coating, slot-die coating, gravure coating, or printing.

According to some implementations, the separator of FIG. 2 may be fabricated utilizing the following processes and equipment. One configuration of a web tool for fabricating separators according to the present disclosure are shown schematically in FIG. 4—it should be noted that this is a schematic representation and it is understood that configuration of the web system and modules may be varied as needed to control the different processes of the fabrication processes.

A dielectric coated separator may be fabricated using tools of the present disclosure as described herein. According to some implementations, a web tool for forming dielectric coated separators may comprise: a reel to reel system for taking a separator through the following modules: a module for depositing a thin film of dielectric material on the separator; wherein the module for depositing the thin film of dielectric material may include an evaporation system, such as an electron-beam evaporator or a thermal evaporator, and a thin film transfer system (including large area pattern printing systems such as gravure printing systems). In some implementations, the tool may further comprise a module for surface modification, such as a plasma pretreatment module, of the separator prior to deposition of the dielectric layer. In some implementations, the tool may further comprise a module for cooling the separator prior to deposition of the dielectric layer. In some implementations, the tool may further comprise a module for plasma treatment of the dielectric layer. In some implementations, the tool may further comprise a module for forming a protective coating over the dielectric layer. Furthermore, in some implementations the tool may further comprise a module for depositing a lithium ion-conducting polymer, a binder soluble in a liquid electrolyte, or a lithium ion-conducting dielectric material into the pores of the separator.

Figure 4:
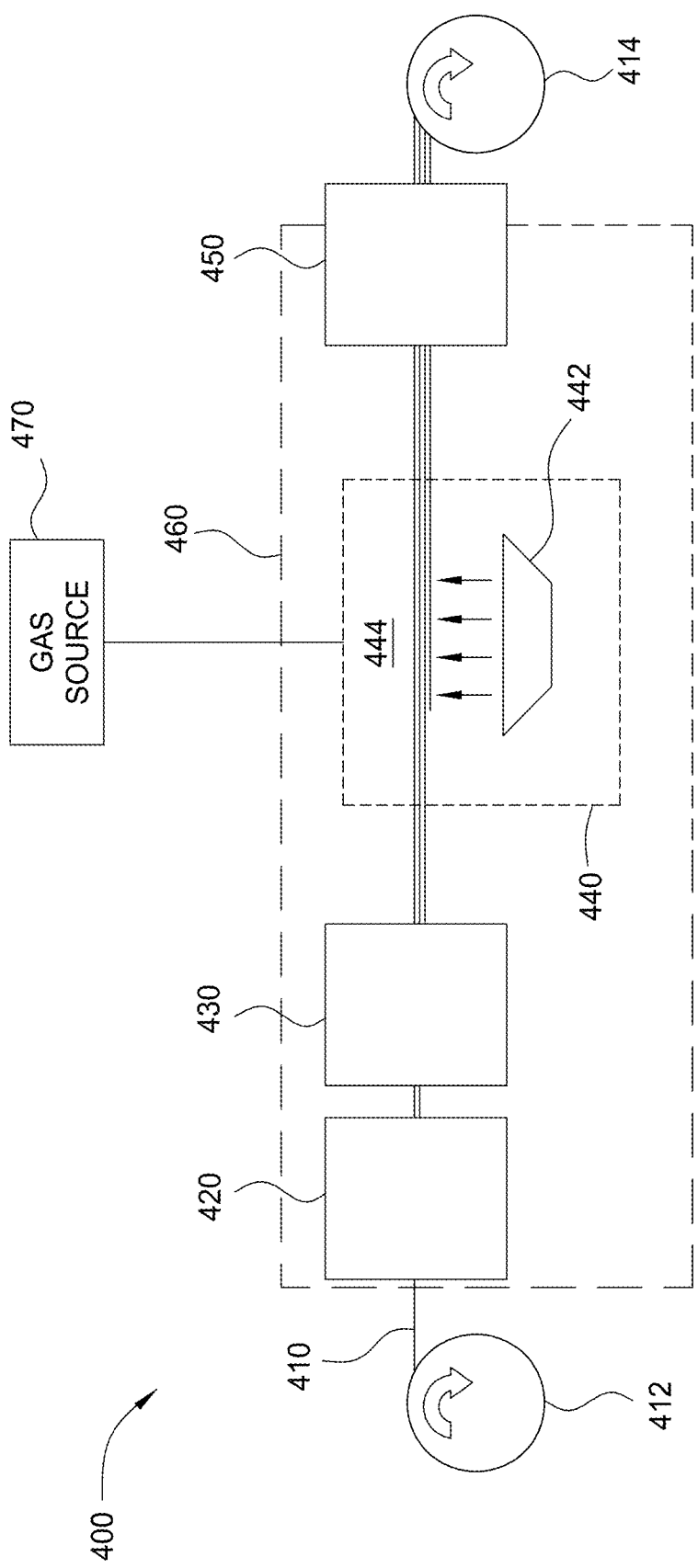
FIG. 4 illustrates a schematic view of a web tool for forming a separator according to implementations described herein.

In FIG. 4, the web tool 400 may comprise: reels 412 and 414 for moving a continuous sheet of separator material 410 through the different processing modules; a module 420 for surface modification of the surface of the separator material 410, a module 430 for cooling the separator material 410, an evaporation module 440 for depositing a dielectric layer on at least one surface of the separator material 410; and a module 450 for forming a protective coating over the dielectric layer. The area 460 indicates a portion of the web tool that may need to be under a controlled environment—for example a nitrogen gas environment. In some implementations, the finished separator will not be collected on reel 414 as shown in the figures, but may go directly for integration with the positive and negative electrodes, etc., to form battery cells.

The evaporation module 440 has a processing region 444 that is shown to comprise an evaporation source 442 that may be placed in a crucible, which may be a thermal evaporator or an electron beam evaporator (cold) in a vacuum environment, for example. A gas source 470 for supplying reactive gas to the processing region 444 is coupled with the processing region 444.

Additional modules may be included. In some implementations, additional modules may provide for deposition of an electrolyte soluble binder for filling the pores of the separator in order to avoid accumulation of dielectrics in the pores during deposition, or in some implementations, additional modules may provide for deposition of a lithium ion-conducting polymer for filling the pores of the separator.

The dielectric layer effectively reduces or eliminates battery cell failures due to thermal shrinkage and associated tearing of separators such as the polyolefin separators. Deposition of the dielectric layer in evaporation module 440 may proceed as described in FIG. 3.

The deposition processes of module 430 may include: for barrier layer deposition a thermal spray, PVD deposition (such as cold electron beam, sputter, etc.), etc.; and for polymer (binder or lithium ion-conducting material) deposition a thermal spray, slot die, etc.

The protective coating formation process of module 450 may include: for a lithium carbonate coating controlled exposure to carbon dioxide (to provide a specific carbonate thickness); for an inorganic protective coating a thermal spray process, PVD deposition process (such as cold electron beam, sputter, etc.), etc.; and for a polymer coating a thermal spray process, slot die process, etc.

A Li-ion battery with a separator according to implementations of the present disclosure may be combined with positive and negative electrodes to form a battery such as schematically shown in FIG. 1. The integration of the separator with the other battery components may occur in the same manufacturing facility used for fabricating the separator, or the separator may be shipped on a spool and integration may occur elsewhere. The process of fabricating a battery proceeds generally as follows: separator, negative electrode and positive electrode are provided; the separator, negative electrode and positive electrode are individually cut into sheets of the desired size for a cell; tabs are added to the cut sheets of positive and negative electrodes; the cut sheets of positive and negative electrodes and separators are combined to form battery cells; battery cells may be wound or stacked to form the desired battery cell configuration; after the winding or stacking, the battery cells are placed in cans, the cans are evacuated, filled with electrolyte and then sealed.

Although implementations of the present disclosure have been particularly described with reference to lithium ion batteries with graphitic negative electrodes, the teaching and principles of the present disclosure may be applicable to other lithium-based batteries such as Li-polymer, Li—S, Li—$FeS_2$, Li metal based batteries, etc. For the Li metal-based batteries such as Li—S and Li—$FeS_2$ a thicker Li metal electrode may be needed and the thickness of Li metal depends on the positive electrode loading. In some implementations the Li metal electrode may be between 3 and 30 microns thick for Li—S and roughly 190-200 microns for Li—$FeS_2$, and may be deposited on one or both sides of a compatible substrate such as a Cu or stainless steel metal foil—the methods and tools described herein may be used to fabricate such Li metal electrodes.

Furthermore, in some implementations a thin (sufficient to compensate for the irreversible loss of lithium metal during the first battery cycle) film of dielectric layer may be deposited directly on the negative electrode using the methods and tools of the present disclosure—for example, a thin film of lithium metal may be deposited on a graphitic (with or without silicon) layer on a suitable electrically conductive substrate (for example copper, etc.).

The foregoing separator, while primarily designed for use in high-energy rechargeable lithium batteries, may be used in other battery systems in which dendrite growth may be a problem.

EXAMPLES

The following non-limiting examples are provided to further illustrate implementations described herein. However, the examples are not intended to be all-inclusive and are not intended to limit the scope of the implementations described herein.

The following examples were performed on a vacuum web coating tool having a metal evaporation source, an electron beam source, a microwave plasma generator, a quartz thickness monitor, having a maximum film speed of 10 meters/minute, a film width of 280 millimeters and a film length of approximately 1 kilometer.

Table I depicts the process conditions for various dielectric films formed according to the implementations described herein.

TABLE I

|  |  | 20 μm single film | 20 μm trilayer film | 16 μm trilayer film |
| --- | --- | --- | --- | --- |
| programmed $AlO_x$ thickness | nm | 45 (single pass) | 135/180 (dual speed multi pass) | 45 |
| coating drum temperature | ° C. | −20 | −20 | −20 |
| web tension | N | 80 | 80 | 80 |
| base pressure | mbar | $<10^{-4}$ | $<10^{-4}$ | $<10^{-4}$ |
| process pressure | mbar | $1 * 10^{-2}$ and $2 * 10^{-2}$ | $1.5 * 10^{-2}$ | $1.5 * 10^{-2}$ |
| total Oxygen flow | sccm | 10100 | 9200 | 9000 |
| diffuse Argon flow | sccm | 0 and 1500 | 1000 | 1000 |
| pretreatment power | W | 500 | 500 | 300 |

Figure 5B:
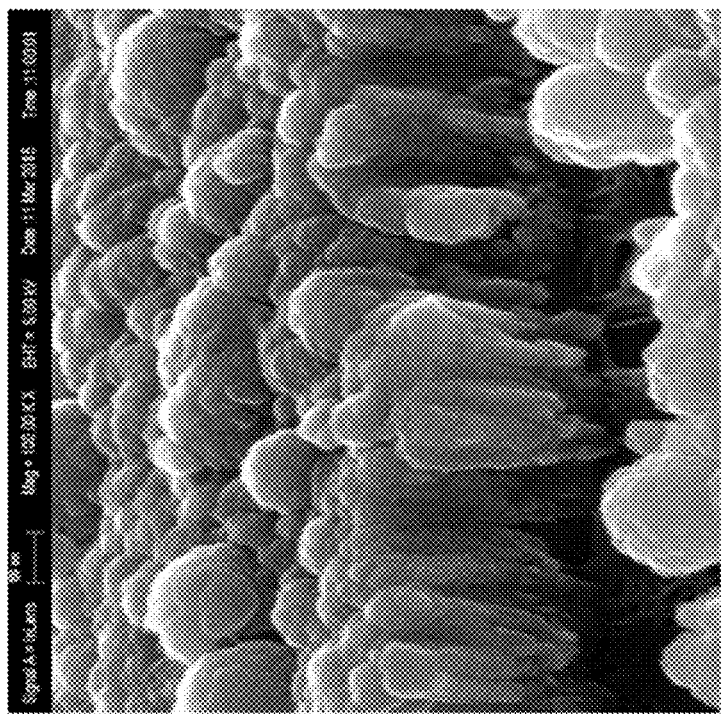
FIGS. 5A-5B illustrate scanning electron microscope (SEM) images of an aluminum oxide layer coated on a 25 micron polymeric separator according to implementations described herein.
Figure 5A:
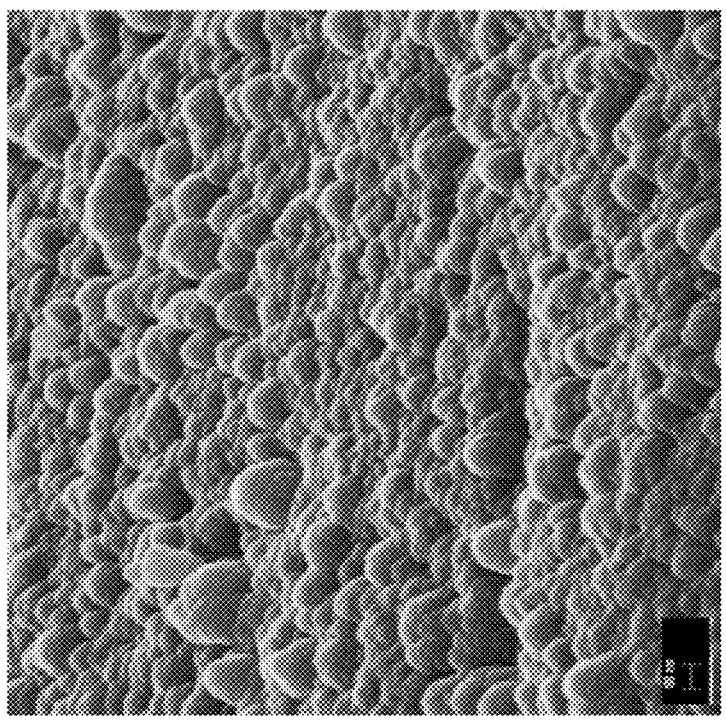

FIGS. 5A-5B illustrates a SEM image of an approximately 100 nanometer aluminum oxide layer coated on a 25 micron polymeric separator according to implementations described herein. The columnar structure of the aluminum oxide dielectric layer is visible in FIG. 5B. Adhesion between the polyolefinic layer and the aluminum oxide layer is also visible.

Figure 6:
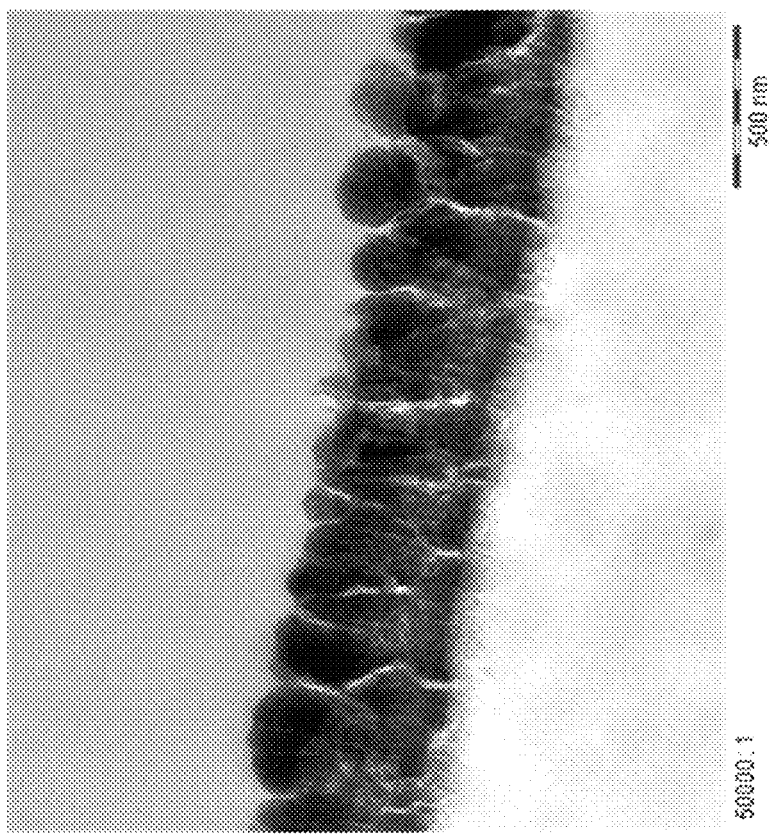
FIG. 6 illustrates a transmission electron microscope (TEM) image of an aluminum oxide layer coated on a 25 micron polymeric separator according to implementations described herein.

FIG. 6 illustrates a TEM image of an approximately 100 nanometer coated on a 25 micron polymeric separator according to implementations described herein. The columnar structure and channels formed between the columns of aluminum oxide are also visible in FIG. 6.

Figure 7:
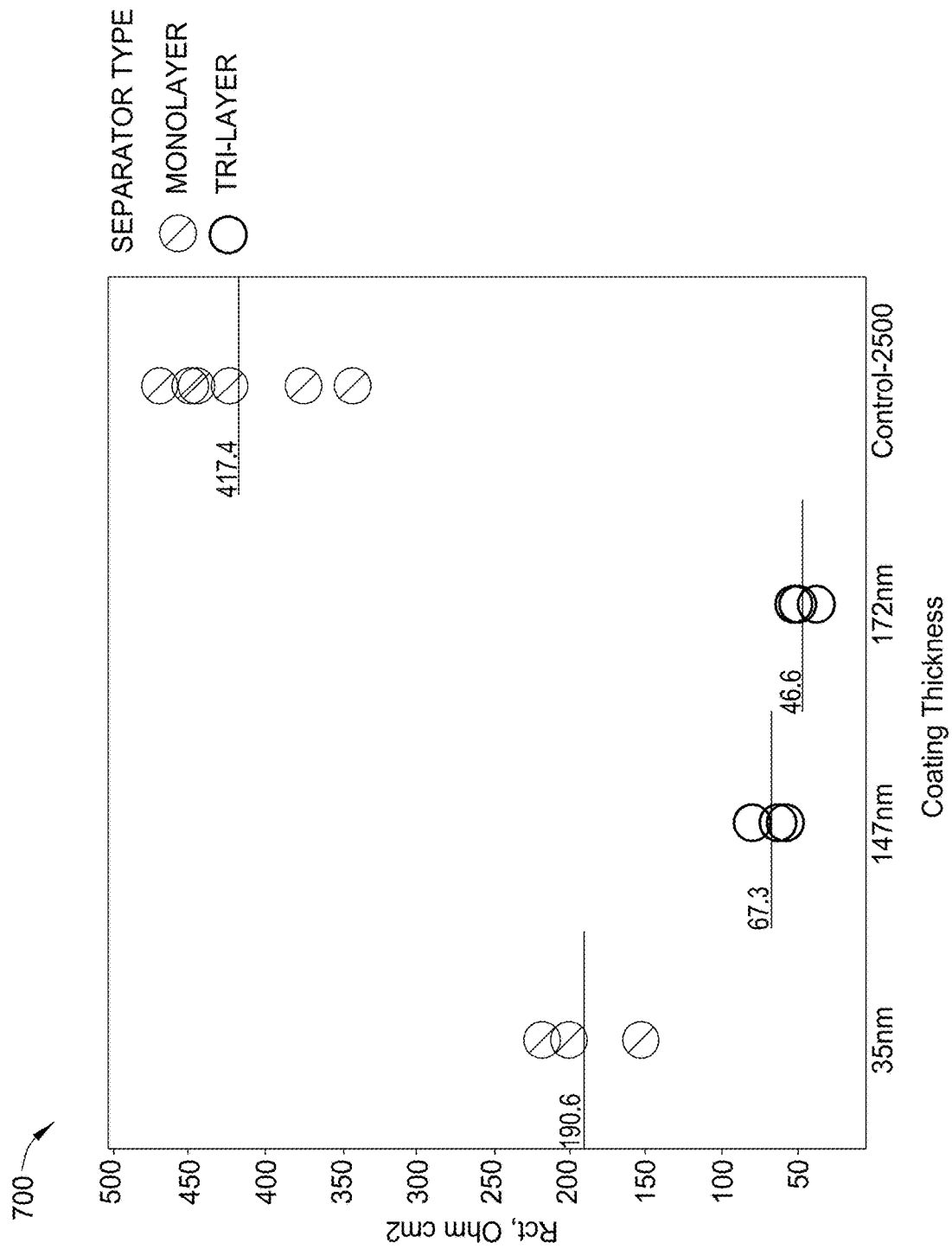
FIG. 7 illustrates a plot depicting charge transfer resistance for monolayer and tri-layer separators with dielectric coating formed according to implementations described herein.

FIG. 7 illustrates a plot 700 depicting charge-transfer resistance ($R_{CT}$) for monolayer and tri-layer separators with dielectric coating formed according to implementations described herein. The y-axis represents charge-transfer resistance ($R_{CT}$). The x-axis represents the thickness of the aluminum oxide layer (35 nanometers, 147 nanometers, and 172 nanometers) formed on both monolayer and tri-layer separators. A control without any aluminum oxide coating was also used. Monolayer separators were used for the 35 nanometer and control. Tri-layer separators were used for the 147 nanometer and 172 nanometer examples. As depicted in FIG. 7, the $R_{CT}$ for all three of the dielectric coated separators is lower than the $R_{CT}$ for the uncoated separator.

Impedance spectra analysis of coin cells is depicted in Table II.

TABLE II

| Li/2 separator_1M LiPF$_6$ in EC:EMC 1:3, 2% VC/Li coin cell | Control | ~35 nm AlO$_x$ | 147 nm AlO$_x$ | 500 nm AlO$_x$ |
|---|---|---|---|---|
| Room Temperature Ionic Conductivity (S/cm) | $3.30 \times 10^{-3}$ | $1.78 \times 10^{-3}$ | $14.3 \times 10^{-3}$ | $13.0 \times 10^{-3}$ |
| Charge Transfer Resistance (Ohm_cm$^2$) | 417.4 | 190.6 | 67.3 | 46.6 |

Thermal shrinkage results are depicted in Table III and Table IV. WD is the web direction and TD is the transverse direction. The thermal shrinkage test was performed using 2×2 cm square cut-outs of separator material with a dielectric coating deposited according to the implementations described herein. Exemplary separator materials include Celgard® PP2075 (20 um microporous monolayer PP membrane), Celgard® PP1615 (16 um microporous monolayer polyethylene membrane), Celgard® 2320 (20 um microporous trilayer membrane (PP/PE/PP)), and Celgard® C210 (16 um microporous trilayer membrane (PP/PE/PP)). As depicted in Table III, there was no visible thermal shrinkage with either a 120 nanometer dielectric coating or a 200 nanometer dielectric coating.

TABLE III

| Sample | Dielectric Coating Thickness | Direction | Pristine cm | 135° C./ 30 minutes cm | 135° C./ 30 minutes Shrinkage % | 135° C./ 60 minutes cm | 135° C./ 60 minutes Shrinkage % |
|---|---|---|---|---|---|---|---|
| 1. | 120 nm | WD | 2 | 2 | 0% | 2 | 0% |
|  |  | TD | 2 | 2 | 0% | 2 | 0% |
| 2. | 200 nm | WD | 2 | 2 | 0% | 2 | 0% |
|  |  | TD | 2 | 2 | 0% | 2 | 0% |

As depicted in Table IV, there was no visible thermal shrinkage with either a 120 nanometer dielectric coating or a 200 nanometer dielectric coating at exposure to temperature of 165 degrees Celsius for 60 minutes with the application of pressure. However, thermal shrinkage was visible at exposure to a temperature of 165 degrees Celsius for 60 minutes without the application of pressure.

TABLE IV

| Sample | Coating Thickness | Direction | Pristine cm | 165° C./ 30 minutes cm | 165° C./ 30 minutes Shrinkage % | 165° C./ 60 minutes with pressure cm | 165° C./ 60 minutes with pressure Shrinkage % |
|---|---|---|---|---|---|---|---|
| 1. | 120 nm | WD | 2 | 1.95 | −2.5% | 2 | 0% |
|  |  | TD | 2 | 2 | 0% | 2 | 0% |
| 2. | 200 nm | WD | 2 | 1.6 | −20.0% | 2 | 0% |
|  |  | TD | 2 | 2 | 0% | 2 | 0% |

Results achieved include: (1) Uniform 30 nm and 175 nm thick AlOx coating was completed using Al evaporation in reactive oxygen environment on porous polyolefin separator of 40 cm wide, 400-800 meters long web, (thickness 16 um, 20 um and 25 um) with corona surface treatment (2) The AlO$_x$ coating adhesion seems to be good with scotch tape peeling tests (3) the wettability of AlO$_x$ coated separator is better than uncoated separator (4) the Li symmetric cells showed 2× reduction in charge transfer resistance compared to control indicating that dielectric coating pores offer least resistance and (5) SEM cross section image showed columnar AlO$_x$ structure and crystallites are aligned vertically on the porous separator substrate.

Table V and Table VI depict the Brunauer-Emmett-Teller (BET) Surface Area Analysis and Barrett-Joyner-Halenda (BJH) Pore Size and Volume Analysis determined using test method ISO 15901-2:2006 for a Celgard® PP1615 separator having a thickness of 16 μm. BET analysis provides surface area evaluation of materials by nitrogen multilayer adsorption measured as a function of relative pressure using a fully automated analyzer. BET techniques encompass external area and pore area evaluations to determine the total specific surface area in m$^2$/g yielding information about surface porosity. BJH techniques are also employed to determine pore area and pore volume with 4V/A pore diameter using adsorption and desorption techniques.

The results are depicted for an uncoated Celgard® PP1615 separator, a Celgard® PP1615 separator coated on one surface with an AlOx layer according to implementations described herein, and a Celgard® PP1615 separator coated with an AlOx layer on opposing sides according to implementations described herein. Column 1 of Table VI is deduced from the adsorption part of the isotherm and column 2 of Table VI is deduced from the desorption part of the isotherm. The results depicted in Table V and Table VI demonstrate that the base material structure (e.g. the porous poly-olefin layer) is not altered by the ceramic coating process.

TABLE V

| Material | BET Total Specific Surface Area (m$^2$/g) | BJH Adsorption Cumulative Area of Pores m$^2$/g | BJH Desorption cumulative surface area of pores m$^2$/g |
|---|---|---|---|
| Celgard®-PP1615_16 μm | 40.17 | 46.41 | 62.11 |
| AlOx_1-side-coated_PP1615 | 34.89 | 41.01 | 56.68 |
| AlOx_2-side-coated_PP1615 | 36.70 | 43.56 | 58.68 |

TABLE VI

| Material | Pore Volume Between 17 Å and 3,000 Å width (cm³/g) (Adsorption) | Pore Volume Between 17 Å and 3,000 Å width (cm³/g) (Desorption) | BJH Adsorption Average Pore Width (4 V/A) (Å) | BJH Desorption Average Pore Width (4 V/A) (Å) |
|---|---|---|---|---|
| Celgard ®-PP1615_16 μm | 0.7175 | 0.7519 | 618.42 | 484.28 |
| AlOx_1-side-coated_PP1615 | 0.6339 | 0.6443 | 618.32 | 454.68 |
| AlOx_2-side-coated_PP1615 | 0.6610 | 0.6635 | 720.22 | 606.97 |

Figure 8:
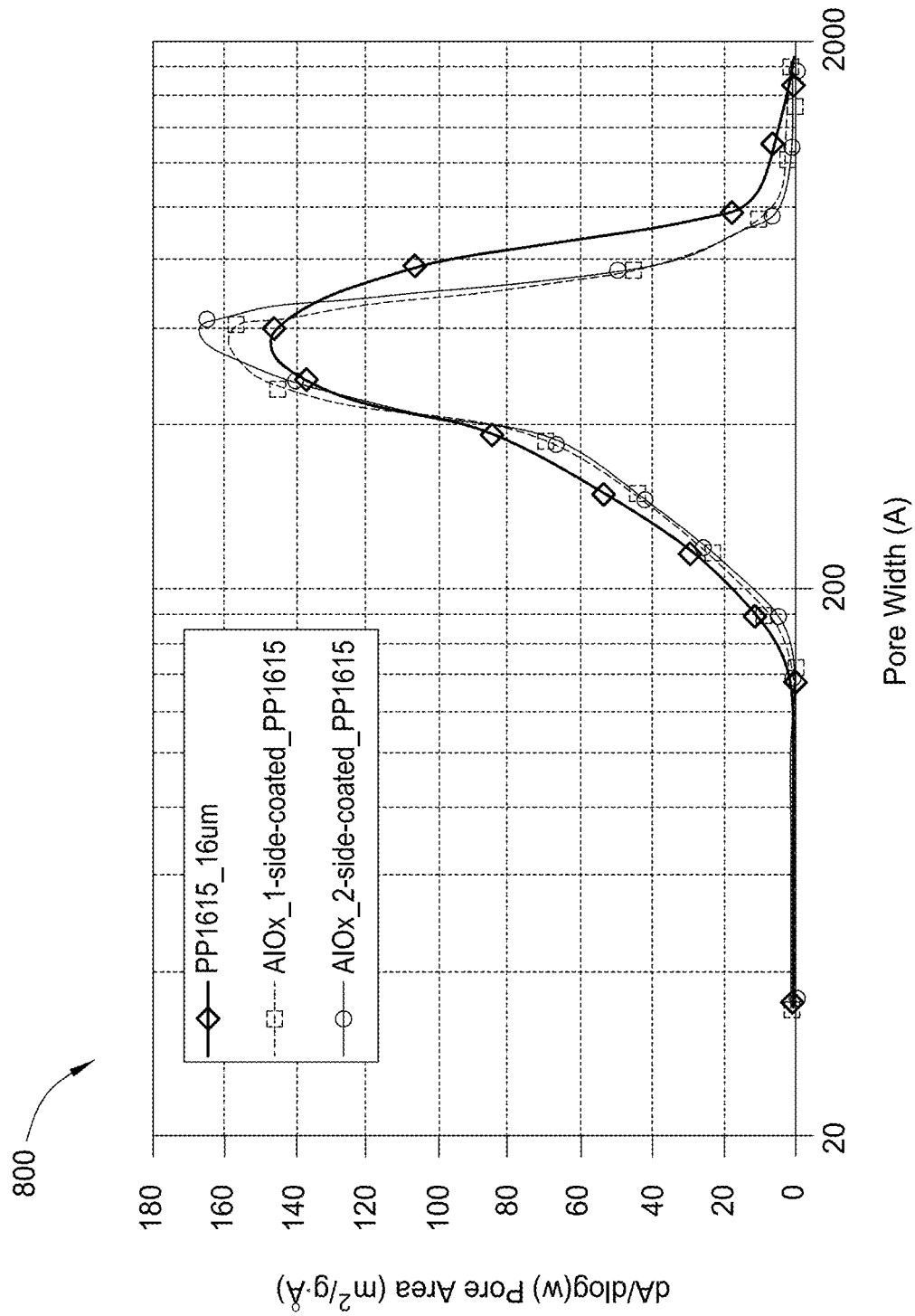
FIG. 8 illustrates a plot depicting pore size distribution based on Barrett-Joyner-Halenda (BJH) analysis for a prior art separator verses a separators with ceramic coating according to implementations described herein.

FIG. 8 illustrates a plot 800 depicting pore size distribution based on Barrett-Joyner-Halenda analysis for a prior art separator verses a separator with ceramic coating according to implementations described herein. The pore size distribution is shown for an uncoated Celgard® PP1615 separator having a thickness of 16 μm, a Celgard® PP1615 separator having a thickness of 16 μm and coated on one surface with a ~250 nm AlOx coating according to implementations described herein, and a Celgard® PP1615 separator having a thickness of 16 μm and coated on two opposing surfaces with a ~200 nm AlOx coating according to implementations described herein.

In some implementations, the substrate has a plurality of pores and the at least one dielectric layer does not block a majority of the pores. In some implementations, the substrate has a plurality of pores and the at least one dielectric layer does not block 60% or more of the pores. For example, in different implementations, the at least one dielectric layer does not block at least 50% or more, 55% or more, 60% or more, 65% or more, 70% or more, 75% or more, 80% or more, 85% or more, 90% or more, or within a range bounded by any two of these values.

Table VII depicts an estimate of the unblocked pores for implementations of the present disclosure. The control substrates labeled as "Control" in the first column are uncoated separators. The second and third columns represent the width and length of the substrate/separator. The fourth column represents the mass of the substrate for the substrates labeled (Control) and the total mass of the substrate and the dielectric coating for the substrates coated according to the present disclosure. The percent of estimated pore unblocked in column 7 is based on the pore volume for the control versus a single layer dielectric coated sample.

Figure 9:
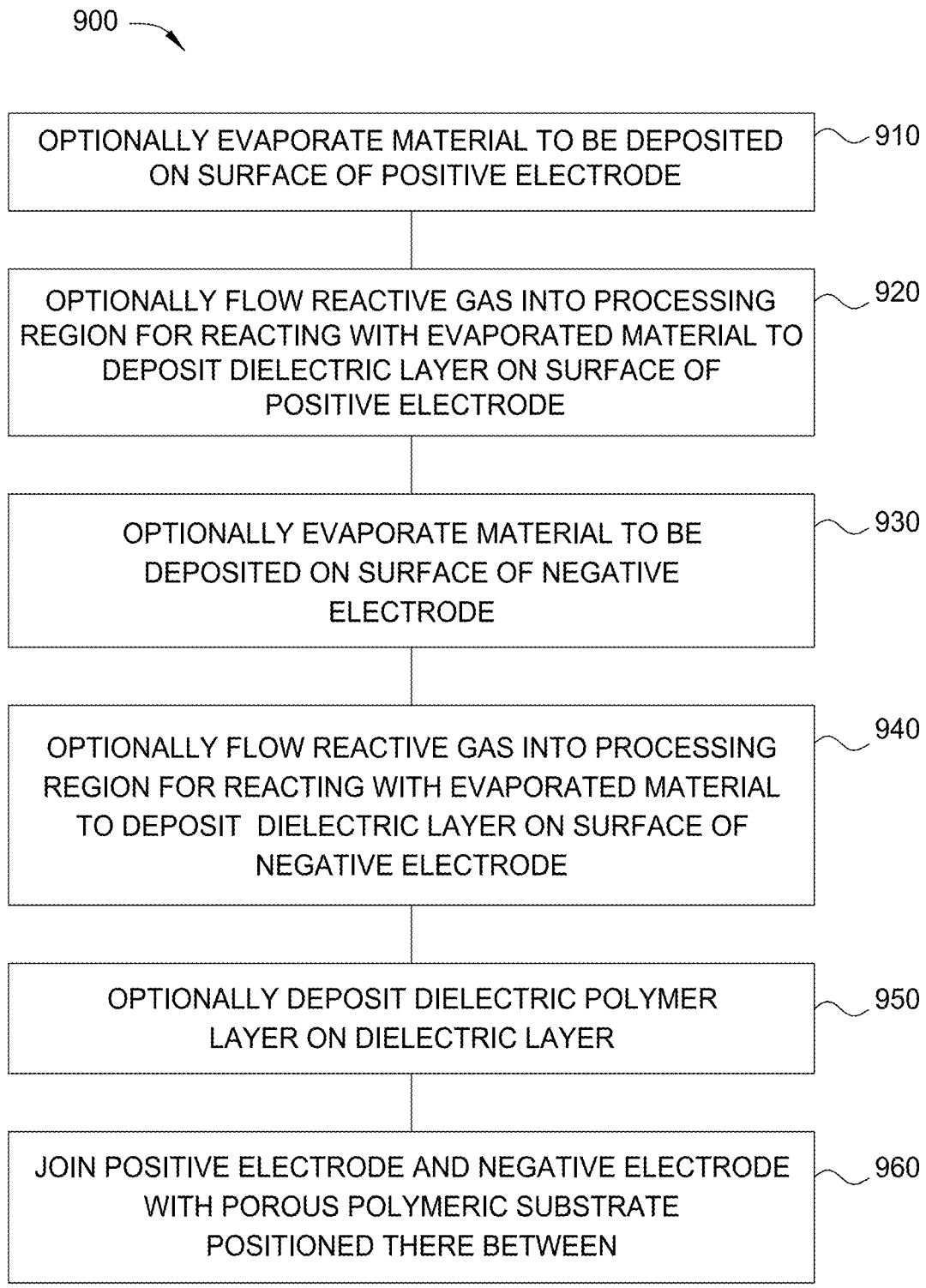
FIG. 9 a process flow chart summarizing another implementation of a method for forming an electrode structure according to implementations described herein.

FIG. 9 a process flow chart summarizing another implementation of a method 900 for forming an electrode structure according to implementations described herein. The method 900 may be used, for example, to form the coated separator 130 depicted in FIG. 2. The method 900 is similar to the method 300 discussed above except that the dielectric material is formed directly on the surface of the anode, the surface of the cathode, or both the surface of the anode and the surface of the cathode.

At block 910, the material to be deposited on the surface of the positive electrode is evaporated. The evaporation process of block 910 may be performed similarly to the evaporation process of block 330 of method 300.

At block 920, a reactive gas is flowed into the processing region for reacting with the evaporated material to deposit dielectric material on at least a portion of a surface of the positive electrode. The process of block 920 may be performed similarly to the evaporation process of block 340 of method 300.

At block 930, the material to be deposited on the surface of the positive electrode is evaporated. The evaporation process of block 930 may be performed similarly to the evaporation process of block 330 of method 300.

At block 940, a reactive gas is flowed into the processing region for reacting with the evaporated material to deposit dielectric material on at least a portion of a surface of the negative electrode. The process of block 940 may be performed similarly to the evaporation process of block 340 of method 300.

At block 950, a dielectric polymer layer may be formed on the dielectric layer. The process of block 950 may be performed similarly to the process of block 360 of method 300.

TABLE VII

| Substrate Thickness, (μm) | Width, (cm) | Length, (cm) | Mass, (g) | BET Surface Area, (m²/g) | Adsorption Pore Volume, (cm³/g) | Estimated pore unblocked (%) | Desorption Average Pore Width, (Å) | Desorption Total Pore Volume, (cm³/g) |
|---|---|---|---|---|---|---|---|---|
| 20 (Control) | 5 | 18 | 0.089 | 65.28 | 0.945 | 100.000 | 579.02 | 0.084 |
| 20 | 5 | 18 | 0.095 | 64.07 | 0.907 | 96.016 | 566.45 | 0.086 |
| 20 | 5 | 18 | 0.092 | 66.84 | 0.950 | 100.562 | 568.68 | 0.087 |
| 16 (Control) | 5 | 18 | 0.067 | 40.17 | 0.737 | 100.000 | 733.43 | 0.049 |
| 16 | 5 | 18 | 0.085 | 36.71 | 0.661 | 89.725 | 720.22 | 0.056 |
| 16 | 5 | 18 | 0.084 | 34.90 | 0.640 | 86.832 | 733.06 | 0.054 |
| 25 (Control) | 5 | 18 | 0.116 | 48.64 | 0.612 | 100.000 | 503.26 | 0.071 |
| 25 | 5 | 18 | 0.135 | 44.35 | 0.508 | 83.013 | 458.17 | 0.069 |

At block 960, the positive electrode and the negative electrode are joined together with the dielectric material and a microporous ion conducting polymer substrate positioned therebetween. In implementations where dielectric material is formed on both the surface of the anode and the surface of the cathode, the electrode structure has a coated separator with a dielectric coating on opposing sides. In implementations where dielectric material is only deposited on either the surface of the anode or the surface of the cathode, the electrode structure has a separator with only one side coated with dielectric material.

While the foregoing is directed to implementations of the present disclosure, other and further implementations of the disclosure may be devised without departing from the basic scope thereof, and the scope thereof is determined by the claims that follow.

The invention claimed is:

1. A method of forming an anode structure, comprising:
 exposing a material to be deposited on an anode positioned in a processing region to an evaporation process;
 flowing a reactive gas into the processing region; and
 reacting the reactive gas and the evaporated material to deposit a porous dielectric layer on at least a portion of the anode and form the anode structure, the porous dielectric layer comprising:
  a plurality of dielectric columnar projections; and
  a nanoporous structure formed between the dielectric columnar projections.

2. The method of claim 1, wherein the material is selected from the group consisting of: aluminum (Al), zirconium (Zr), hafnium (Hf), niobium (Nb), tantalum (Ta), titanium (Ti), yttrium (Y), lanthanum (La), silicon (Si), boron (B), silver (Ag), chromium (Cr), copper (Cu), indium (In), iron (Fe), magnesium (Mg), calcium (Ca), strontium (Sr), barium (Ba), nickel (Ni), tin (Sn), ytterbium (Yb), lithium (Li), calcium (Ca) and combinations thereof.

3. The method of claim 1, wherein the reactive gas is an oxygen-containing gas selected from the group consisting of oxygen ($O_2$), ozone ($O_3$), oxygen radicals ($O^*$), ionized oxygen atoms, carbon dioxide ($CO_2$), nitric oxide ($NO_x$), water vapor, and combinations thereof.

4. The method of claim 1, wherein the porous dielectric layer is a porous aluminum oxide.

5. The method of claim 4, wherein the porous aluminum oxide further comprises zirconium oxide, silicon oxide, or combinations thereof.

6. The method of claim 1, wherein the evaporation process is a thermal evaporation process or an electron beam evaporation process.

7. The method of claim 1, wherein the anode is exposed to a surface modification treatment process to enhance nucleation conditions of the anode.

8. The method of claim 7, wherein the surface modification treatment process comprises:
 supplying a treatment gas mixture into the processing region; and
 forming a plasma from the treatment gas mixture to plasma treat at least a portion of the anode, wherein the treatment gas mixture comprises an oxygen-containing gas, an inert gas, or combinations thereof.

9. The method of claim 1, further comprising exposing the anode to a cooling process prior to exposing the material to the evaporation process.

10. The method of claim 9, wherein the cooling process cools the anode to a temperature between −20 degrees Celsius and 22 degrees Celsius.

11. The method of claim 1, further comprising forming a dielectric polymer layer on the porous dielectric layer.

12. The method of claim 1, wherein the anode contains at least one of lithium metal, lithium-alloy, or a mixture of lithium metal and lithium alloy.

13. The method of claim 12, wherein the anode further contains a material selected from the group consisting of carbon, nickel, copper, tin, indium, silicon, and combinations thereof.

\* \* \* \* \*